United States Patent
Kepler et al.

(10) Patent No.: US 10,573,885 B2
(45) Date of Patent: Feb. 25, 2020

(54) LITHIUM SOURCE MATERIAL AND PREPARATION METHOD THEREOF AND USE IN LI-ION CELLS

(71) Applicant: Farasis Energy (Ganzhou) Co., Ltd., Ganzhou (CN)

(72) Inventors: Keith D. Kepler, Belmont, CA (US); Hongjian Liu, Hercules, CA (US); Robbert M. Vermeulen, Pleasant Hill, CA (US)

(73) Assignee: Farasis Energy (Ganzhou) Co., Ltd., Ganzhou (CN)

( * ) Notice: Subject to any disclaimer, the term of this patent is extended or adjusted under 35 U.S.C. 154(b) by 212 days.

(21) Appl. No.: 15/877,568

(22) Filed: Jan. 23, 2018

(65) Prior Publication Data

US 2018/0212231 A1    Jul. 26, 2018

Related U.S. Application Data (60) Provisional application No. 62/553,382, filed on Sep. 1, 2017, provisional application No. 62/449,890, filed on Jan. 24, 2017.

(51) Int. Cl.
| | |
|---|---|
| *H01M 4/13915* | (2010.01) |
| *H01M 4/04* | (2006.01) |
| *C01G 51/00* | (2006.01) |
| *C01G 49/00* | (2006.01) |
| *H01M 4/02* | (2006.01) |
| *H01M 10/0525* | (2010.01) |

(52) U.S. Cl.
CPC ...... *H01M 4/13915* (2013.01); *C01G 49/009* (2013.01); *C01G 49/0027* (2013.01); *C01G 51/42* (2013.01); *H01M 4/0471* (2013.01); *C01P 2002/52* (2013.01); *H01M 10/0525* (2013.01); *H01M 2004/028* (2013.01)

(58) Field of Classification Search
CPC .................. H01M 4/13915; H01M 4/388
See application file for complete search history.

(56) References Cited

U.S. PATENT DOCUMENTS 5,674,645 A  * 10/1997 Amatucci .......... C01G 45/1242
423/464
6,432,581 B1 * 8/2002 Amatucci ............. H01M 4/382
423/599
(Continued)

FOREIGN PATENT DOCUMENTS

JP           2003068302 A   *  3/2003

*Primary Examiner* — Matthew J Merkling
(74) *Attorney, Agent, or Firm* — Volpe and Koenig, P.C.

(57) ABSTRACT

The present invention relates to Li-ion cells area, particularly relates to lithium source material and preparation method thereof and use in Li-ion cells. Wherein the lithium source material which is represented by a formula $Li_yFe_{1-x}M_xO_4R_z$, wherein M represents one or more of transition metal elements, R represents halogen element, $0 \leq x \leq 0.9$, $0 < z \leq 0.2$, $3.5 < y \leq [5(1-x)+6x]$. The lithium source material of the present invention which is lithium deficient relative to its stoichiometric lithium formulation, is a lithium source additive material to the cathode material for Li-ion cells, and exhibits high capacity and high stability.

20 Claims, 2 Drawing Sheets (56) References Cited

U.S. PATENT DOCUMENTS

| | | | |
|---|---|---|---|
| 2003/0235758 A1* | 12/2003 | Wu | C01G 45/1242 |
| | | | 429/224 |
| 2004/0202933 A1* | 10/2004 | Yamaki | C01G 3/02 |
| | | | 429/231.1 |
| 2009/0087362 A1* | 4/2009 | Sun | C01G 45/1221 |
| | | | 423/179.5 |
| 2012/0077064 A1* | 3/2012 | Sasakawa | H01M 2/02 |
| | | | 429/92 |
| 2016/0260968 A1* | 9/2016 | Atwater | H01M 4/505 |

* cited by examiner

LITHIUM SOURCE MATERIAL AND PREPARATION METHOD THEREOF AND USE IN LI-ION CELLS

CROSS REFERENCE TO RELATED APPLICATIONS

This application claims the benefit of U.S. Provisional Patent Application No. 62/449,890, which was filed Jan. 24, 2017 and titled "Lithium Source Materials for Li-ion Batteries with Improved Performance Characteristics," and U.S. Provisional Patent Application No. 62/553,382, which was filed on Sep. 1, 2017 and titled "High Lithium Content Materials for Lithium-ion Batteries with Improved Performance Characteristics," both of which are incorporated herein by reference as if fully set forth.

FIELD OF THE INVENTION

The present invention relates to Li-ion cells area, particularly relates to lithium source material and preparation method thereof and use in Li-ion cells.

BACKGROUND OF THE INVENTION

Despite providing the highest energy density commercially available, current Li-ion rechargeable battery technology still falls short of the desired energy, power and cost requirements of new applications such as electric vehicles (EV/PHEV's), electric bikes and scooters, web-enabled cell phones, and other advanced portable power applications. The use of very high capacity advanced negative electrode materials based on materials such as silicon and silicon carbon composite become more interested in achieving high energy density Li-ion cells. However, except its very high-volume expansion during charging and discharging, the silicon or silicon base negative electrode materials is suffered high irreversible capacity loss, too. There is a number of strategies for overcoming the high irreversible loss of silicon base anode, such as pre-lithiation of negative electrode material, providing extra lithium into a lithium ion cell apart from the positive electrode active material, etc. Battery systems that provide electrochemical energy conversion and storage are a practical solution to multiple energy generation applications, and a viable economic alternative to fossil fuel use. While rechargeable lithium-ion batteries provide the highest energy densities of commercial battery systems, the power generated does not currently meet the requirements of large scale electric vehicle and electric grid storage applications. New cell materials and lithium-ion cell technologies are needed to achieve greater energy densities.

The focus on new material development for lithium-ion batteries has been limited to materials compatible with assembling the lithium-ion cell in the discharged state, as is the current convention. This approach does provide significant benefits since active materials in the discharged state are stable and safely handled during cell manufacturing processes. Importantly, handling of lithium metal or highly reactive lithiated negative electrode materials is avoided, reducing manufacturing costs and increasing safety. The major disadvantage in utilizing discharged cell materials to construct lithium-ion cells is that the lithium available for cycling is derived solely from the active material of the positive electrode, which has a relatively low energy density, in the 140 mAh/g to 180 mAh/g range for materials currently used in conventional lithium-ion batteries. Additionally, such low energy density, discharged positive electrode materials limit the choice of negative electrode materials to those with small irreversible capacities because the negative electrode consumes lithium directly from the low energy density positive electrode active material. Without the limitation of such low energy density discharged positive electrode materials, the use of very high capacity negative electrode materials, such as silicon and tin would become practical. This would enable the production of higher energy density lithium-ion battery systems than are currently commercially available.

Several promising lithium-ion intercalating positive electrode materials that exist in the charged state could provide significant energy density increases if a source of lithium is provided in addition to the positive electrode active material. These intercalating materials include vanadium oxides such as $V_2O_5$ and $LiV_3O_8$, with theoretical capacities in the range of 300 mAh/g to 400 mAh/g; manganese oxides such as $MnO_2$ with capacities exceeding 300 mAh/g. The vanadium oxide materials seemed promising because of their long cycle life, small voltage window, high capacity at moderately low voltage, low cost and safety. Unfortunately, the one battery system developed using vanadium oxide positive electrode materials proved to be impossible to manufacture in a commercially viable manner, due to safety issues that could not be resolved.

Strategies for providing additional lithium, not derived from the positive or negative electrode active materials, into a lithium-ion cell have been explored. Key requirements for such methods are, first, that the lithium source materials have a high effective lithium capacity so as not to negatively impact the cell energy density, and, second, that the lithium source material be sufficiently stable to be safely incorporated into the cell. To date such strategies have focused on the negative electrode as the lithium source material, and have involved handling of highly reactive lithiated materials or sacrificial lithium electrodes that have had negative impacts on manufacturing cost, safety and cell yield, or have required radical new cell designs and manufacturing processes, making them commercially infeasible.

SUMMARY OF THE INVENTION

The present invention provides a lithium source material and preparation method thereof and use in li-ion cells. The lithium source material can be incorporated into the positive electrode material working with the primary positive electrode active material but provide additional lithium to the cells instead of the positive electrode active material, and it is an ideal candidate lithium source to lithium-ion secondary batteries because of its low cost, stability and very high theoretical capacity.

Therefore, one aspect of the present invention relates to a lithium source material which is represented by a formula $Li_yFe_{1-x}M_xO_4R_z$, wherein M represents one or more of transition metal elements, R represents halogen element, $0 \leq x \leq 0.9$, $0 < z \leq 0.2$, $3.5 < y \leq [5(1-x)+6x]$.

The second aspect of the present invention provides a method for preparation of the lithium source material mentioned above, comprising:

(1) providing a slurry containing lithium containing compound, oxide compound of Fe, optional oxide compound of metal M and LiR, a formulation of the lithium containing compound, oxide compound of Fe, optional oxide compound of metal M and LiR would be selected according to the desired lithium source material represented by the formula $Li_yFe_{1-x}M_xO_4R_z$;

(2) drying the slurry and grinding the dried one;
(3) subjecting the ground mixture to have a first firing treatment, and then subjecting the obtained product from the first firing treatment to have a second firing treatment; wherein a temperature of the first firing treatment is 400-650° C.; a temperature of the second firing treatment is 700-1000° C.

The third aspect of the present invention provides a lithium source composition comprising the lithium source material according the first aspect of the present invention and a positive electrode active material.

The fourth aspect of the present invention provides a positive electrode comprising the composition according to the third aspect of the present invention in a positive electrode material layer.

The fifth aspect of the present invention provides a lithium ion cell comprising the positive electrode according to the fourth aspect of the present invention.

The lithium source material of the present invention which is lithium deficient relative to its stoichiometric lithium formulation, is a lithium source additive material to the cathode material for Li-ion cells, and exhibits high capacity and high stability.

BRIEF DESCRIPTION OF DRAWINGS

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

FIG. 1 shows that low cobalt doped (x=0.1 and 0.3) had low capacity and similar impedance as that without cobalt doped, whereas high cobalt doped (x=0.7 and 0.9) had wired charging curves at voltage greater than 4.1V, likely lithium plating (internal short) occurred. The one with x=0.5 maintained similar charging curve as that without cobalt doped, but had higher capacity and lower impedance.

FIG. 2 shows that with stoichiometric lithium content, Li5.5 for cobalt doped with x=0.5 and Li5.55 for cobalt doped with 0.5 and fluorine doped with 0.05, both of them showed charging curves tuning down at voltage greater than 4.3V (indicating internal short caused likely by lithium plating) and had lower capacities comparing to that of lithium deficient composition of Li5.05 for cobalt doped with 0.5 and fluorine doped with 0.05. Therefore, it is preferable with lithium deficient composition.

DETAILED DESCRIPTION OF THE EMBODIMENTS

Hereunder the embodiments of the present invention will be specified in details. It should be appreciated that the embodiments described here are only provided to describe and explain the present invention, but shall not be deemed as constituting any limitation to the present invention.

The first aspect of the present invention relates to a lithium source material which is represented by a formula $Li_yFe_{1-x}M_xO_4R_z$, wherein M represents one or more of transition metal elements, R represents halogen element, $0 \leq x \leq 0.9$, $0 < z \leq 0.2$, $3.5 < y \leq [5(1-x)+6x]$.

As mentioned above, the lithium source material is lithium deficient relative to its stoichiometric lithium formulation of $Li_5FeO_4$, or/and a combination of stoichiometric lithium formulation of $Li_5FeO_4$ and $Li_6MO_4$, following a specific x value.

In the present invention, x, y and z may be any value in the above mentioned ranges, preferably, $0.1 \leq x \leq 0.9$, more preferably $0.2 \leq x \leq 0.8$, such as x=0.2, 0.25, 0.3, 0.35, 0.4, 0.45, 0.5, 0.55, 0.6, 0.65, 0.7, 0.75 or 0.8, most preferably $0.3 \leq x \leq 0.6$.

Preferably, $4 < y \leq [5(1-x)+6x]$, more preferably $4 < y \leq 5.9$, more preferably $4.5 \leq y \leq 5.6$, such as y=4.5, 4.8, 5, 5.1, 5.2, 5.3, 5.4, 5.5 or 5.6, most preferably $5 \leq y \leq 5.2$ such as y=5.01, 5.03, 5.05, 5.08, 5.1, 5.13, 5.15, 5.18 or 5.2.

Preferably, $0.05 \leq z \leq 0.2$, such as z=0.05, 0.08, 0.1, 0.12, 0.15, 0.18 or 0.2, more preferably $0.05 \leq z \leq 0.15$.

In a preferred embodiment of the present invention, $4 \leq y \leq [5(1-x)+6x]$ and $0.05 \leq z \leq 0.2$. In another embodiment of the present invention, $4.5 \leq y \leq 5.6$ and $0.05 \leq z \leq 0.2$. In a preferred embodiment of the present invention, $5 \leq y \leq 5.2$ and $0.05 \leq z \leq 0.2$. In further embodiment of the present invention, $0.3 < x < 0.6$ and $0.05 \leq z \leq 0.2$.

In the present invention, element M represents one or more of transition metal elements, especially transition metal elements in valence of +3. If x>0, the lithium source material would be a metal element M doped lithium source material which exhibits higher capacity over the lithium source material without doped M. Wherein, M preferably represents one or more of V, Cr, Mn, Co, Ni, Cu, Y, Zr and Nb, more preferably represents one or more of V, Cr, Mn, Co and Ni, and most preferably represents Co.

In the present invention, element R represents halogen element, such as F, Cl or Br, preferably is F.

In a preferable embodiment of the present invention, M represents one or more of V, Cr, Mn, Co and Ni, R represents F. In a more preferable embodiment of the present invention, M represents Co, R represents F. In a most preferable embodiment of the present invention, M represents Co, R represents F, $0.3 < x < 0.6$ and $0.05 \leq z \leq 0.2$, further preferably $5 \leq y \leq 5.2$ in this embodiment.

The specific examples of the lithium source material of the present invention may be selected from the following lithium source materials: $Li_{5.05}Fe_{0.5}Co_{0.5}O_4F_{0.05}$, $Li_{5.1}Fe_{0.5}Co_{0.5}O_4F_{0.10}$, $Li_{5.15}Fe_{0.5}Co_{0.5}O_4F_{0.15}$ and $Li_{5.2}Fe_{0.5}Co_{0.5}O_4F_{0.20}$.

The second aspect of the present invention provides a method for preparation of the lithium source material mentioned above, comprising:
(1) providing a slurry containing lithium containing compound, oxide compound of Fe, optional oxide compound of metal M and LiR, a formulation of the lithium containing compound, oxide compound of Fe, optional oxide compound of metal M and LiR would be selected according to the desired lithium source material represented by the formula $Li_yFe_{1-x}M_xO_4R_z$;
(2) drying the slurry and grinding the dried one;
(3) subjecting the ground mixture to have a first firing treatment, and then subjecting the obtained product from the first firing treatment to have a second firing treatment;

wherein a temperature of the first firing treatment is 400-650° C.; a temperature of the second firing treatment is 700-1000° C.

In the present invention, the reactants in the slurry in step (1) are selected based on the desired lithium source material represented by the formula $Li_yFe_{1-x}M_xO_4R_z$ in order to prepare the designed $Li_yFe_{1-x}M_xO_4R_z$. Wherein, the lithium containing compound may be any alkaline compound containing lithium, such as one or more of lithium hydroxide (can be in its hydrate form, such as $LiOH \cdot H_2O$), lithium carbonate, and etc. Oxide compound of Fe may be selected from any oxide compound of metal Fe, such as one or more of $Fe_2O_3$, FeO, $Fe_3O_4$ and etc., the preferred oxide compound of Fe is $Fe_2O_3$. Oxide compound of metal M can be selected from any oxide compound of metal M, for example, when M represents Co, the oxide compound of metal Co may be one or more of $Co_2O_3$, CoO, $Co_3O_4$ and etc., preferably is $Co_3O_4$. LiR may be any lithium halide, if R represents F, then LiR would be LiF. All the reactants for preparing $Li_yFe_{1-x}M_xO_4R_z$ are commercially available or easy to be synthetized by the conventional method in the art.

In addition, the content ratio of lithium containing compound, oxide compound of Fe, optional oxide compound of metal M and LiR in the slurry may be determined by the molar ratio represented by the formula $Li_yFe_{1-x}M_xO_4R_z$, such as added amount of lithium containing compound, oxide compound of Fe, optional oxide compound of metal M and LiR makes a molar ratio of element Li, element Fe, element M and element R in the slurry be around y: (1−x): x: z, wherein x, y and z are as described above.

In the present invention, solvent in the slurry may be varied in a large solvent group, preferably solvent used in the slurry is one or more of methanol, ethanol, n-propanol, iso-propanol, water, ethyl acetate, methyl acetate, THF and DMSO, more preferably is one or more of methanol, ethanol, n-propanol, iso-propanol and water. The amount of the solvent can be varied in a large range, preferably the amount of the solvent would make the concentration of the slurry be 10-40 wt %, more preferably be 15-30 wt %.

In the present invention, the slurry can be prepared by mixing lithium containing compound, oxide compound of Fe, optional oxide compound of metal M and LiR in the solvent mentioned above, wherein a preferred condition for mixing the reactants includes: a temperature of 70-100° C., a time of 30-90 min.

In the present invention, the slurry prepared by step (1) would be dried and ground in step, wherein a preferred condition of the drying process includes: a temperature of 70-100° C. (preferably is 75-90° C.), a time of 8-20 h (preferably is 10-15 h), and the drying process can be operated in a vacuum oven. The grinding process may be operated by any conventional manner such as by using a mortar and pestle, as long as the ground mixture is fine enough to be fired in step (3).

In the present invention, the ground mixture prepared by step (2) would be fired by two firing stages in step (3), wherein preferably, the temperature of the first firing treatment is 450-600° C., more preferably is 480-550° C. Preferably temperature of the second firing treatment is 750-950° C., more preferably is 780-900° C. Preferably a time of the first firing treatment is 8-20 h, more preferably is 10-15 h. Preferably a time of the second firing treatment is 20-50 h, more preferably is 24-40 h, further more preferably is 32-38 h. In a preferred embodiment of the present invention, the temperature of the first firing treatment is 450-600° C.; temperature of the second firing treatment is 750-950° C.; a time of the first firing treatment is 8-20 h; a time of the second firing treatment is 20-50 h. In another preferred embodiment of the present invention, the temperature of the first firing treatment is 480-550° C.; temperature of the second firing treatment is 780-900° C.; a time of the first firing treatment is 10-15 h; a time of the second firing treatment is 24-40 h. The firing procedure may be operated in a retort furnace or in a tube furnace, and the present invention has no limit to it.

In the present invention, in step (3), preferably, the ground mixture is heated at a heating rate of 3-10° C./min to the temperature of the first firing treatment (from room temperature (such as 15-30° C.)), and the obtained product from the first firing treatment is heated at a heating rate of 3-10° C./min to the temperature of the second firing treatment (from the temperature of the first firing treatment). Wherein, the first firing treatment can be held under an air or inert atmosphere, and the second firing treatment is preferably held under an inert atmosphere, wherein the inert atmosphere can be provided by helium, neon, argon or any combination thereof.

In order to obtain a lithium source material with smaller size or certain size, the method of the present invention may further comprises grinding the fired product prepared by step (3) and sieving the ground product to obtain a lithium source material with certain particle size, such as 100 μm or smaller, 80 μm or smaller, 60 μm or smaller, 50 μm or smaller.

The third aspect of the present invention provides a lithium source composition comprising the lithium source material according the first aspect of the present invention and a positive electrode active material.

In the present invention, the composition containing the lithium source material and a positive electrode active material would be used in a positive electrode material layer of a positive electrode to provide lithium, wherein the positive electrode active material may be any conventional positive electrode active material in the art, preferably, the positive electrode active material is one or more of $LiCoO_2$, $LiNi_{0.5}Mn_{1.5}O_4$, $LiNi_xCo_yMn_zO_2$ (NCM) and $LiNi_xCo_yAl_zO_2$, wherein 0<x'<1, 0<y'<1, 0<z'<1, and x'+y'+z'=1, more preferably the positive electrode active material is one or more of $LiNi_{0.5}Co_{0.2}Mn_{0.3}O_2$ (NCM523), $LiNi_{0.8}Co_{0.1}Mn_{0.1}O_2$ (NCM811), $LiNi_{0.6}Co_{0.2}Mn_{0.2}O_2$ (NCM622) and $LiNi_{0.8}Co_{0.15}Al_{0.05}O_2$ (NCA).

In the present invention, the weight ratio of the lithium source material and the positive electrode active material may be varied in a large range, preferably, a weight ratio of the lithium source material and the positive electrode active material is 0.5:99.5 to 30:70, more preferably is 2:98 to 8:92.

The fourth aspect of the present invention provides a positive electrode comprising the composition according to the third aspect of the present invention in a positive electrode material layer.

In the present invention, typically, the positive electrode comprises a current collector and a positive electrode material layer thereon, while the substantial difference between the positive electrode of the present invention and the prior positive electrode is that the positive electrode material layer of the positive electrode of the present invention contains the composition of the present invention.

The current collector may be any current collector used in the art, such as aluminum foil, aluminum mesh and etc., the thickness of the current collector may be varied in a large range, such as 15-25 μm.

Except the composition of the present invention, the positive electrode material layer may contain any additives commonly used in the art; typically, the positive electrode material layer further contains a conductive agent and a binder. Wherein, the conductive agent may be any common conductive agent in the art, for example, the conductive agent may be one or more of conductive carbon black, graphite, graphene, carbon nano-materials and etc. The binder may be any common binder in the art, for example, the binder may be one or more of polyvinylidene fluoride (PVDF), polyvinyl alcohol (PVA), butadiene styrene rubber (SBR), sodium carboxymethyl cellulose (CMC) and etc. The amount of the conductive agent and the binder may be varied in a large range, preferably, a weight ratio of the composition, the conductive agent and the binder is 70-98: 1-15:1-15, more preferably is 90-95: 3-10:2-10. In the present invention, the thickness of the positive electrode material layer may be varied in a large range, preferably the thickness of the positive electrode material layer is 30-150 μm, more preferably is 50-120 μm.

In the present invention, the positive electrode can be prepared by the common method in the art, for example the method for preparation of the positive electrode can comprise:
(1) providing a positive electrode slurry containing the composition, the conductive agent and the binder;
(2) depositing the positive electrode slurry on the current collector and drying the obtained product so as to form a positive electrode material layer on the current collector.

In the method for preparation of the positive electrode, solvent used in the positive electrode slurry may be any solvent suitable for preparation the positive electrode slurry, for example, 1-methyl-2-pyrrolidone (NMP), The amount of the solvent may be varied in a large range, for example, the amount of the solvent would make the total concentration of the composition, the conductive agent and the binder be 20-70 wt %, preferably be 35-50 wt %. The slurry may be prepared by mixing all the materials in the solvent by introducing the materials in one time or step by step, preferably, the preparation process of the slurry comprises: mixing the binder with the solvent to form a binder solution, then adding the conductive agent and the composition step by step into the binder solution and mixing for a certain time (such as 1-3 h) to form the positive electrode slurry.

In step (2) of the method above, the positive electrode slurry can be deposited on the current collector by any common means in the art such as by coating using a coater, then the current collector deposited with the positive electrode slurry would be dried to obtain the positive electrode, preferably a condition of the drying process includes: a temperature of 60-100° C., a time of 1-3 h.

The fifth aspect of the present invention provides a lithium ion cell comprising the positive electrode according to the fourth aspect of the present invention.

The lithium ion cell may comprise a positive electrode of the present invention, a negative electrode, a polymer separator, and an electrolyte. The negative electrode typically is lithium metal electrode. The polymer separator may be any commonly used electrolyte separator in the art, such as porous polyolefin separator (like porous PP separator, porous PE separator). The electrolyte may be any electrolyte commonly used in the art, typically is an organic solution of lithium salt of which concentration may be 0.5-2 mol/L, the lithium salt may be one or more of $LiPF_6$, $LiClO_4$, $LiBF_4$, LiBOB, $LiN(SO_2CF_3)_2$, and etc. Organic solvent used in the electrolyte may be one or more of ethylene carbonate (EC), diethyl carbonate (DEC), dimethyl carbonate (DMC), ethyl methyl carbonate (EMC) and etc., preferably is a mixed solvent of EC and DEC with a weight ratio of 1:9 to 4:6.

Below the present invention is described in detail by referring to embodiments.

Example 1

This example is intended to illustrate the lithium source material and preparation method thereof in the present invention.

(1) 20.981 g of $LiOH·H_2O$, 3.992 g of $Fe_2O_3$, 4.013 g of $Co_3O_4$ and 0.1297 g of LiF are added to 100 g of methanol, and stirred at 85° C. with an overhead mixer for about 1 hour to form a slurry;

(2) the slurry is dried in a vacuum oven at 85° C. for 12 hours, and the dried mixture is ground using a mortar and pestle;

(3) In a retort furnace, the dried and ground mixture is firstly fired at a rate of 5° C./min from 30° C. to 500° C. in air, and held at 500° C. for 12 hours, following which the mixture is further fired at a rate of ° C./min from 500° C. to 850° C. in argon, and held at 850° C. for 36 hours; finally the fired product is ground using mortar and pestle, sieved through a 50 μm mesh screen, and collected in an argon filled glovebox. The obtained product is a lithium source material represented by formula $Li_{5.05}Fe_{0.5}Co_{0.5}O_4F_{0.05}$, with a particle size lower than 50 μm.

Example 2

This example is intended to illustrate the lithium source material and preparation method thereof in the present invention.

According to example 1, wherein the difference is that the reactants used in step (1) of example 1 are replaced by reactants: 20.981 g of $LiOH·H_2O$, 3.992 g of $Fe_2O_3$, 4.013 g of $Co_3O_4$ and 0.2594 g of LiF; The finally obtained product is a lithium source material represented by formula $Li_{5.1}Fe_{0.5}Co_{0.5}O_4F_{0.10}$, with a particle size lower than 50 μm.

Example 3

This example is intended to illustrate the lithium source material and preparation method thereof in the present invention.

According to example 1, wherein the difference is that wherein the difference is that the reactants used in step (1) of example 1 are replaced by reactants: 20.981 g of $LiOH·H_2O$, 3.992 g of $Fe_2O_3$, 4.013 g of $Co_3O_4$ and 0.3891 g of LiF;

The finally obtained product is a lithium source material represented by formula $Li_{5.15}Fe_{0.5}Co_{0.5}O_4F_{0.15}$, with a particle size lower than 50 μm.

Example 4

This example is intended to illustrate the lithium source material and preparation method thereof in the present invention.

According to example 1, wherein the difference is that the reactants used in step (1) of example 1 are replaced by reactants: 20.981 g of $LiOH·H_2O$, 3.992 g of $Fe_2O_3$, 4.013 g of $Co_3O_4$ and 0.5188 g of LiF; The finally obtained product is a lithium source material represented by formula $Li_{5.2}Fe_{0.5}Co_{0.5}O_4F_{0.2}$, with a particle size lower than 50 μm.

Comparative Example 1

According to example 1, wherein the difference is that the reactants used in step (1) of example 1 are replaced by reactants: 20.981 g of $LiOH·H_2O$ and 7.985 g of $Fe_2O_3$;

The finally obtained product is a lithium source material represented by formula $Li_5FeO_4$, with a particle size lower than 50 μm.

Comparative Example 2

According to example 1, wherein the difference is that the reactants used in step (1) of example 1 are replaced by reactants: 21.820 g of $LiOH \cdot H_2O$ and 7.985 g of $Fe_2O_3$;
The finally obtained product is a lithium source material represented by formula $Li_{5.2}FeO_4$, with a particle size lower than 50 μm.

Comparative Example 3

According to example 1, wherein the difference is that the reactants used in step (1) of example 1 are replaced by reactants: 20.981 g of $LiOH \cdot H_2O$, 7.186 g of $Fe_2O_3$ and 0.803 g of $Co_3O_4$;
The finally obtained product is a lithium source material represented by formula $Li_5Fe_{0.9}Co_{0.1}O_4$, with a particle size lower than 50 μm.

Comparative Example 4

According to example 1, wherein the difference is that the reactants used in step (1) of example 1 are replaced by reactants: 20.981 g of $LiOH \cdot H_2O$, 5.589 g of $Fe_2O_3$ and 2.408 g of $Co_3O_4$;
The finally obtained product is a lithium source material represented by formula $Li_5Fe_{0.7}Co_{0.3}O_4$, with a particle size lower than 50 μm.

Comparative Example 5

According to example 1, wherein the difference is that the reactants used in step (1) of example 1 are replaced by reactants: 20.981 g of $LiOH \cdot H_2O$, 3.992 g of $Fe_2O_3$ and 4.013 g of $Co_3O_4$;
The finally obtained product is a lithium source material represented by formula $Li_5Fe_{0.5}Co_{0.5}O_4$, with a particle size lower than 50 μm.

Comparative Example 6

According to example 1, wherein the difference is that the reactants used in step (1) of example 1 are replaced by reactants: 20.981 g of $LiOH \cdot H_2O$, 2.395 g of $Fe_2O_3$ and 5.619 g of $Co_3O_4$;
The finally obtained product is a lithium source material represented by formula $Li_5Fe_{0.3}Co_{0.7}O_4$, with a particle size lower than 50 μm.

Comparative Example 7

According to example 1, wherein the difference is that the reactants used in step (1) of example 1 are replaced by reactants: 20.981 g of $LiOH \cdot H_2O$, 0.798 g of $Fe_2O_3$ and 7.224 g of $Co_3O_4$;

The finally obtained product is a lithium source material represented by formula $Li_5Fe_{0.1}Co_{0.9}O_4$, with a particle size lower than 50 μm.

Comparative Example 8

According to example 1, wherein the difference is that the reactants used in step (1) of example 1 are replaced by reactants: 23.079 g of $LiOH \cdot H_2O$, 3.992 g of $Fe_2O_3$ and 4.013 g of $Co_3O_4$;
The finally obtained product is a lithium source material represented by formula $Li_{5.5}Fe_{0.5}Co_{0.5}O_4$, with a particle size lower than 50 μm.

Comparative Example 9

According to example 1, wherein the difference is that the reactants used in step (1) of example 1 are replaced by reactants: 23.079 g of $LiOH \cdot H_2O$, 3.992 g of $Fe_2O_3$, 4.013 g of $Co_3O_4$ and 0.1297 g of LiF;
The finally obtained product is a lithium source material represented by formula $Li_{5.55}Fe_{0.5}Co_{0.5}O_4F_{0.05}$, with a particle size lower than 50 μm.

Test Example 1

Li ion cell preparing process includes:
(1) 0.7 g PVDF (Solef 5130) is added to 6.3 g 1-methyl-2-pyrrolindinone (NMP) and stirred to form a PVDF binder solution, then the powder components were added to the binder solution step by step in the order of 0.2 g carbon black (Timcal Super-P), 0.4 g graphite (Timcal KS6), and 8.7 g lithium source material (separately prepared by the above examples) in a dry-air atmosphere and stirred with an overhead mixer for about 2 hours, to form a slurry. The slurry was deposited on to an aluminum current collector foil (20 μm in thickness) using a lab-made coater and dried at 85° C. for about 2 hours to form a positive electrode material layer on the current collector, and a positive electrode is obtained.
(2) A CR2032 coin cell is assembled with the positive electrode prepared as above, a Celgard porous polyolefin separator, a lithium metal negative electrode, and an electrolyte of 1.2 mol/L $LiPF_6$ in EC/DEC in a 3:7 ratio by weight.

Wherein the coin cells using the lithium source material prepared by the above examples 1-4 are represented by C1-C4 respectively, while the coin cells using the lithium source material prepared by the above comparative examples 1-9 are represented by DC1-DC9 respectively, and the following table 1 would outline the above coin cells using different lithium source materials prepared by the above examples.

Figure 1:
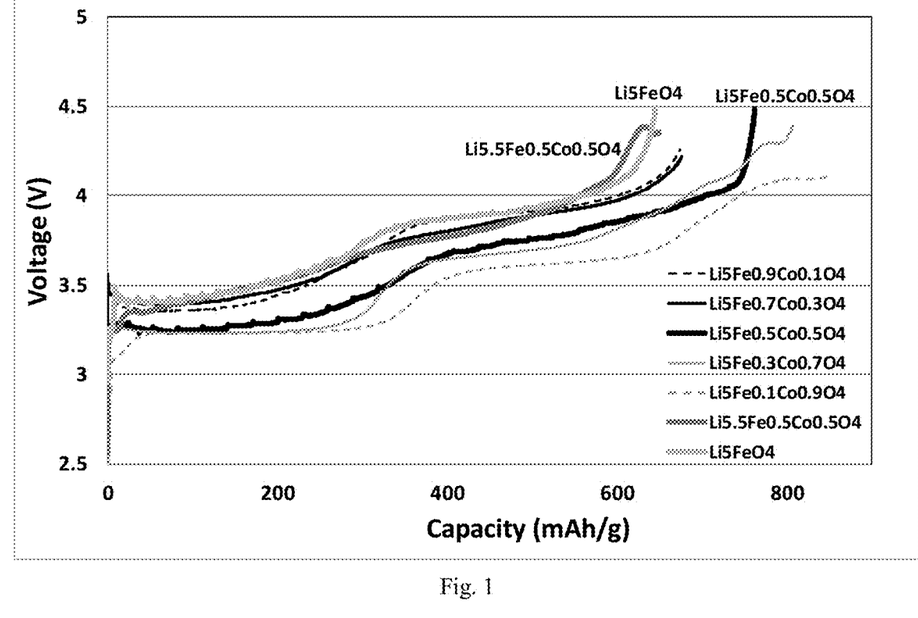
FIG. 1 shows a graphical representation of first charge capacities vs. voltage curves of some lithium source materials measured in Test example 1.
Figure 2:
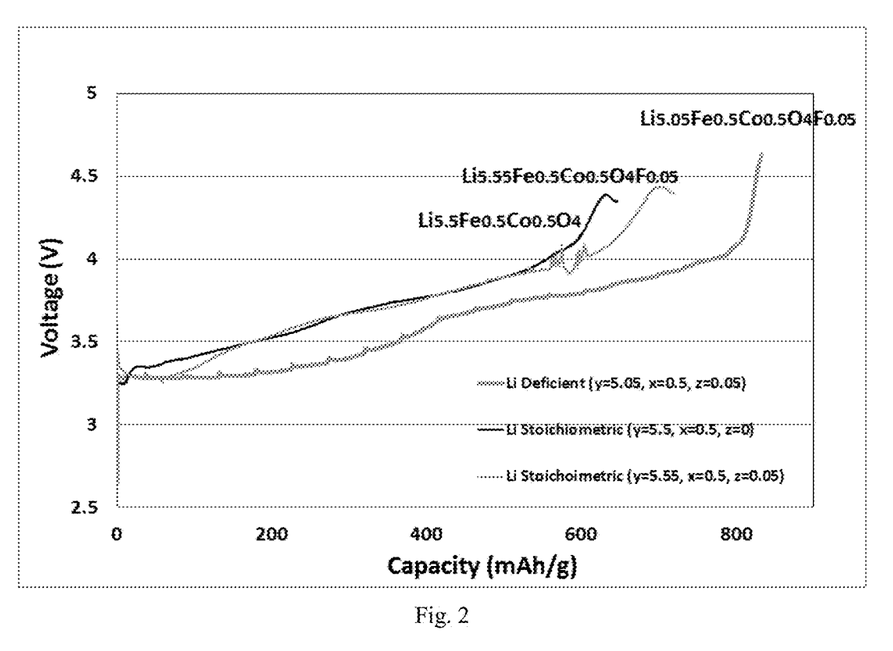
FIG. 2 shows a graphical representation of first charge capacities vs. voltage curves of some other lithium source materials measured in Test example 1.
Figure 3:
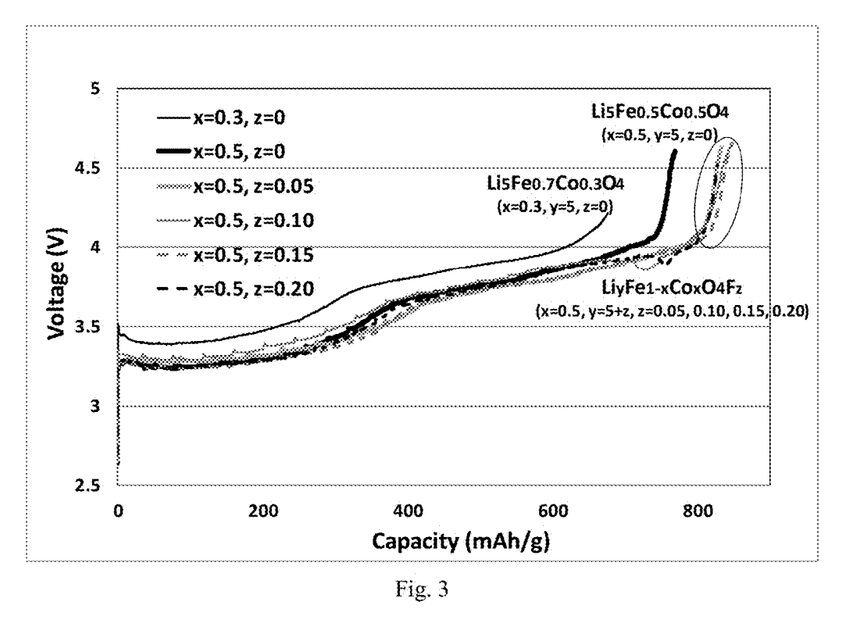
FIG. 3 is a graphical representation of first charge capacities vs. voltage curves of fluorine doped lithium source materials measured in Test example 1.

First charge specific capacity: the coin cells are tested using 5 mA units of LAND Battery Testing System at 30° C. using a 0.05 mA constant current in a voltage range of 3.0V to 4.95V to test the first charge specific capacities, and the results are shown in table 2 and FIG. 1 to FIG. 3.

TABLE 1

| | | Lithium source material | |
| --- | --- | --- | --- |
| Coin cell | Preparation exmaple | Composition | Description |
| C1 | Example 1 | $Li_{5.05}Fe_{0.5}Co_{0.5}O_4F_{0.05}$ | Li deficient fluorine doped |

TABLE 1-continued

| Coin cell | Preparation example | Lithium source material Composition | Description |
|---|---|---|---|
| C2 | Example 2 | $Li_{5.1}Fe_{0.5}Co_{0.5}O_4F_{0.10}$ | Li deficient fluorine doped |
| C3 | Example 3 | $Li_{5.15}Fe_{0.5}Co_{0.5}O_4F_{0.15}$ | Li deficient fluorine doped |
| C4 | Example 4 | $Li_{5.2}Fe_{0.5}Co_{0.5}O_4F_{0.2}$ | Li deficient fluorine doped |
| DC1 | Comparative example 1 | $Li_5FeO_4$ | Li soichiometric LFO |
| DC2 | Comparative example 2 | $Li_{5.2}FeO_4$ | 0.2Li excess LFO |
| DC3 | Comparative example 3 | $Li_5Fe_{0.9}Co_{0.1}O_4$ | Li deficient cobalt doped |
| DC4 | Comparative example 4 | $Li_5Fe_{0.7}Co_{0.3}O_4$ | Li deficient cobalt doped |
| DC5 | Comparative example 5 | $Li_5Fe_{0.5}Co_{0.5}O_4$ | Li deficient cobalt doped |
| DC6 | Comparative example 6 | $Li_5Fe_{0.3}Co_{0.7}O_4$ | Li deficient cobalt doped |
| DC7 | Comparative example 7 | $Li_5Fe_{0.1}Co_{0.9}O_4$ | Li deficient cobalt doped |
| DC8 | Comparative example 8 | $Li_{5.5}Fe_{0.5}Co_{0.5}O_4$ | Li stoichiometric cobalt doped |
| DC9 | Comparative example 9 | $Li_{5.55}Fe_{0.5}Co_{0.5}O_4F_{0.05}$ | Li stoichiometric fluorine doped |

TABLE 2

| Coin cell | Lithium source material | First charge specific capacity mAh/g |
|---|---|---|
| C1 | $Li_{5.05}Fe_{0.5}Co_{0.5}O_4F_{0.05}$ | 833 |
| C2 | $Li_{5.1}Fe_{0.5}Co_{0.5}O_4F_{0.10}$ | 846 |
| C3 | $Li_{5.15}Fe_{0.5}Co_{0.5}O_4F_{0.15}$ | 848 |
| C4 | $Li_{5.2}Fe_{0.5}Co_{0.5}O_4F_{0.2}$ | 831 |
| DC1 | $Li_5FeO_4$ | 650 |
| DC2 | $Li_{5.2}FeO_4$ | 650 |
| DC3 | $Li_5Fe_{0.9}Co_{0.1}O_4$ | 672 |
| DC4 | $Li_5Fe_{0.7}Co_{0.3}O_4$ | 675 |
| DC5 | $Li_5Fe_{0.5}Co_{0.5}O_4$ | 769 |
| DC6 | $Li_5Fe_{0.3}Co_{0.7}O_4$ | ~770 |
| DC7 | $Li_5Fe_{0.1}Co_{0.9}O_4$ | ~770 |
| DC8 | $Li_{5.5}Fe_{0.5}Co_{0.5}O_4$ | ~635 |
| DC9 | $Li_{5.55}Fe_{0.5}Co_{0.5}O_4F_{0.05}$ | ~700 |

From the above tables, it can be seen that the lithium source material of the present invention exhibits high capacity.

Test Example 2

The lithium source materials of $Li_{5.05}Fe_{0.5}Co_{0.5}O_4F_{0.05}$, $Li_5FeO_4$, and $Li_5Fe_{0.5}Co_{0.5}O_4$ are separately exposed to environmental air for 1 hour, and then are used to form CR2032 coin cell as test example 1, the first charge specific capacities of the obtained coin cells are tested as test example 1, capacity loss of each coin cell is calculated by the following formulation:

Capacity loss=$(C0-C1)/C0*100\%$, wherein C0=First charge specific capacity before exposed to environmental air, mAh/g;
C1=first charge specific capacity after exposed to environmental air for 1 hour, mAh/g.
The result capacity loss is shown in table 3.

TABLE 3

| Lithium source material | Capacity loss |
|---|---|
| $Li_{5.05}Fe_{0.5}Co_{0.5}O_4F_{0.05}$ | 18% |
| $Li_5FeO_4$ | 69% |
| $Li_5Fe_{0.5}Co_{0.5}O_4$ | 34% |

From the above table, it can be seen that the lithium source material of the present invention, except delivering a high first charge capacity (Table 2), it exhibits high stability, especially high moisture stability.

Composition Example

This example is intended to illustrate the composition in the present invention.

The compositions are prepared according to the formulation listed in the table 4, then 5 kinds of composition consisting of the lithium source material of the present invention and a positive electrode active material are prepared.

TABLE 4

| | Lithium source material weight percentage | positive electrode active material weight percentage |
|---|---|---|
| Composition 1 | $Li_{5.05}Fe_{0.5}Co_{0.5}O_4F_{0.05}$ 10 wt % | NCM523 90 wt % |
| Composition 2 | $Li_{5.05}Fe_{0.5}Co_{0.5}O_4F_{0.05}$ 20 wt % | NCM523 80 wt % |
| Composition 3 | $Li_{5.05}Fe_{0.5}Co_{0.5}O_4F_{0.05}$ 2 wt % | NCM811 98 wt % |
| Composition 4 | $Li_{5.05}Fe_{0.5}Co_{0.5}O_4F_{0.05}$ 5 wt % | NCM811 95 wt % |
| Composition 5 | $Li_{5.05}Fe_{0.5}Co_{0.5}O_4F_{0.05}$ 8 wt % | NCM811 92 wt % |

Test Example 3

Li ion cells are prepared according to similar preparing process as in test example 1, wherein the differences are: (1) compositions 1-5 prepared by the above composition example, pure NCM523 and NCM811 are used to replace lithium source material in the test example 1 respectively, and (2) the weight ratios changed, with the each amount of the compositions 1-5 prepared by the above composition examples respectively, pure NCM523 or NCM811 is 14.25 g; the amount of PVDF is 0.27 g, the amount of carbon black is 0.30 g, the amount of graphite is 0.18 g, the amount of NMP is 2.70 g; (3) finally the coin cell using each of the compositions 1-5 is represented by SC1-SC5 respectively, the coin cell using each of pure NCM523 and NCM811 is represented by DSC1 and DSC2 respectively.

First charge specific capacity: the coin cells are tested using 5 mA units of LAND Battery Testing System at 30° C. using a 0.25 mA constant current in a voltage range of 3.0V to 4.55V for NCM523 based materials, and 3.0V to 4.3V for NCM811 based materials to test the first cycle specific capacities and the results are shown in table 5.

TABLE 5

| Coin cell | Lithium containing materials in Positive electrode | First charge specific capacity mAh/g |
|---|---|---|
| SC1 | Composition 1 | 248 |
| SC2 | Composition 2 | 303 |
| DSC1 | Pure NCM523 | 206 |
| SC3 | Composition 3 | 223 |
| SC4 | Composition 4 | 236 |
| SC5 | Composition 5 | 243 |
| DSC2 | Pure NCM811 | 214 |

From the above table, it can be seen that the composition containing the lithium source material of the present invention and a positive electrode active material exhibits higher first charge capacity than that of pure NCM material. The extra lithium extracted from the added lithium source material of this invention will be sacrificed to compensate the irreversible capacity loss from the negative electrode active material, so that the lithium extracted from the positive electrode active material will maintain as cyclic lithium to the lithium-ion battery system.

The described and illustrated embodiments are to be considered as illustrative and not restrictive in character, it being understood that only the specific embodiments according to the invention have been shown and described and that all changes and modifications that come within the scope of the invention, as set out in the accompanying claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "one" are used to preface a feature there is no intention to limit the claim to only one such feature unless specifically stated to the contrary in the claim.

Above the preferred embodiments of the present invention are described in details, but the present invention is not limited to the concrete details of the foregoing embodiments. Within the scope of the technical conception of the present invention, the technical scheme of the present invention may have various simple modifications. They all shall be within the scope of protection of the present invention.

Besides, it should be noted that the concrete technical features described in the foregoing embodiments may be combined in any appropriate way under the condition of no conflict. In order to avoid unnecessary repetition, all the possible combinations of the present invention are not described separately.

Further, the embodiments of the present invention may be freely combined provided that such combinations won't go against the thinking of the present invention. Likewise, they should also be deemed as the content disclosed by the present invention.

What is claimed is:

1. A lithium source material which is represented by a formula $Li_yFe_{1-x}M_xO_4R_z$, wherein M represents one or more of transition metal elements, R represents halogen element, $0 \leq x \leq 0.9$, $0 < z \leq 0.2$, $3.5 < y \leq [5(1-x)+6x]$.

2. The lithium source material according to claim 1, wherein M represents one or more of V, Cr, Mn, Co, Ni, Cu, Y, Zr and Nb; R represents F, Cl or Br.

3. The lithium source material according to claim 2, wherein M represents one or more of V, Cr, Mn, Co and Ni.

4. The lithium source material according to claim 3, wherein M represents Co, R represents F.

5. The lithium source material according to claim 1, wherein $0.3 \leq x \leq 0.6$.

6. The lithium source material according to claim 1, wherein $4 < y \leq [5(1-x)+6x]$ and $0.05 \leq z \leq 0.2$.

7. The lithium source material according to claim 6, wherein $4.5 \leq y \leq 5.6$.

8. The lithium source material according to claim 6, wherein $5 \leq y \leq 5.2$ and $0.05 \leq z \leq 0.2$.

9. The lithium source material according to claim 1, wherein $0.3 < x < 0.6$, $0.05 \leq z \leq 0.2$.

10. A method for preparation of the lithium source material according to claim 1, comprising:
   (1) providing a slurry containing lithium containing compound, oxide compound of Fe, optional oxide compound of metal M and LiR, a formulation of the lithium containing compound, oxide compound of Fe, optional oxide compound of metal M and LiR would be selected according to the desired lithium source material represented by the formula $Li_yFe_{1-x}M_xO_4R_z$;
   (2) drying the slurry and grinding the dried one;
   (3) subjecting the ground mixture to have a first firing treatment, and then subjecting the obtained product from the first firing treatment to have a second firing treatment;
   wherein a temperature of the first firing treatment is 400-650° C.; a temperature of the second firing treatment is 700-1000° C.

11. The method according to claim 10, wherein solvent used in the slurry is one or more of methanol, ethanol, n-propanol, iso-propanol, water, ethyl acetate, methyl acetate, THF and DMSO; or/and amount of the solvent would make the concentration of the slurry be 10-40 wt %.

12. The method according to claim 10, wherein a condition of the drying process includes: a temperature of 70-100° C., a time of 8-20 h.

13. The method according to claim 10, wherein the temperature of the first firing treatment is 450-600° C.; temperature of the second firing treatment is 750-950° C.; or/and a time of the first firing treatment is 8-20 h; a time of the second firing treatment is 20-50 h.

14. The method according to claim 13, wherein the temperature of the first firing treatment is 480-550° C.; temperature of the second firing treatment is 780-900° C.; or/and
   a time of the first firing treatment is 10-15 h; a time of the second firing treatment is 24-40 h.

15. The method according to claim 10, wherein in step (3), the ground mixture is heated at a heating rate of 3-10° C./min to the temperature of the first firing treatment, and the obtained product from the first firing treatment is heated at a heating rate of 3-10° C./min to the temperature of the second firing treatment; or/and
   the first firing treatment is held under an air or inert atmosphere, and the second firing treatment is held under an inert atmosphere.

16. A lithium source composition comprising the lithium source material according to claim 1 and a positive electrode active material.

17. The composition according to claim 16, wherein a weight ratio of the lithium source material and the positive electrode active material is 0.5:99.5 to 30:70.

18. The composition according to claim 16, wherein the positive electrode active material is one or more of $LiCoO_2$, $LiNi_{0.5}Mn_{1.5}O_4$, $LiNi_xCo_{y'}Mn_{z'}O_2$(NCM) and $LiNi_xCo_{y'}Al_{z'}O_2$, wherein $0<x'<1$, $0<y'<1$, $0<z'<1$, and $x'+y'+z'=1$.

19. A positive electrode comprising the composition according to claim 16 in a positive electrode material layer.

20. A lithium ion cell comprising the positive electrode according to claim 19.

* * * * *